United States Patent [19]

Rosenquist

[11] Patent Number: 4,469,860

[45] Date of Patent: Sep. 4, 1984

[54] AROMATIC POLYCARBONATE RESIN END CAPPED WITH HYDROXY ARYLENE SULFONATE

[75] Inventor: Niles R. Rosenquist, Evansville, Ind.

[73] Assignee: General Electric Company, Mt. Vernon, Ind.

[21] Appl. No.: 306,188

[22] Filed: Sep. 28, 1981

[51] Int. Cl.³ ............................................. C08G 63/62
[52] U.S. Cl. .................................. 528/196; 525/462; 528/198; 528/200
[58] Field of Search ...................... 528/196, 198, 200; 525/462

[56] References Cited

U.S. PATENT DOCUMENTS

| | | | |
|---|---|---|---|
| 3,933,734 | 1/1976 | Mark et al. | 528/196 |
| 4,188,475 | 2/1980 | Margotte | 528/175 |
| 4,195,156 | 3/1980 | Bruckdorfer | 528/196 |
| 4,285,855 | 8/1981 | Tokuda | 525/469 |
| 4,289,685 | 9/1981 | Druschke et al. | 528/196 |

Primary Examiner—Harold D. Anderson
Attorney, Agent, or Firm—Martin B. Barancik

[57] ABSTRACT

Non-Newtonian flow characteristics are achieved by partially end-capping a polycarbonate with a sulfonated compound. The novel polymers are used in blow molding applications.

23 Claims, No Drawings

AROMATIC POLYCARBONATE RESIN END CAPPED WITH HYDROXY ARYLENE SULFONATE

BACKGROUND OF THE INVENTION

Aromatic carbonate polymers have been endcapped with a variety of end-capping reagents. The most commonly employed family of compounds is the monophenols. The physical characteristics of aromatic carbonate polymers endcapped with the family of phenols are well known. For example, the rheology of these polymers is markedly Newtonian over a wide range of shear rates. However, for certain end uses of aromatic carbonate polymers such as the blow molding of bottles and profile extrusion it is definitely advantageous to have non-Newtonian rheology. Such rheology has been generally achieved by the uses of monomers which provide branching in the aromatic carbonate polymer. A new method for providing non-Newtonian rheology in an aromatic carbonate polymer has now been discovered.

SUMMARY OF THE INVENTION

In accordance with the invention there is a composition comprising an aromatic carbonate polymer partially endcapped with an essentially non-emulsion making and non-Newtonian rheology making quantity of a moiety derived from a compound of the formula

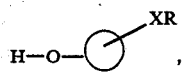

wherein 

is phenyl or naphthyl,

X is a sulfonate ($SO_3^{\ominus}$) group located on the ring in a position which is not ortho to the hydroxyl group, and R is an alkali or alkaline earth metal cation.

Furthermore there is an aromatic carbonate polymer prepared from a process comprising contacting at a pH greater than or equal to about 12 a dihydric phenol with a carbonate precursor in the presence of a phenolic chain stopper and an essentially non-emulsion making and now-Newtonian rheology making quantity of a compound of the formula

wherein 

is phenyl or naphthyl,

X is a sulfonate ($SO_3^{\ominus}$) group located on the ring in a position which is not ortho to the hydroxyl group, and R is an alkali or alkaline earth metal cation.

Additionally there is a process for preparing an end-capped aromatic carbonate polymer which comprises contacting at a pH of greater than or equal to about 12 a dihydric phenol with a carbonate precursor in the presence of a phenolic chain stopper and an essentially non-emulsion and non-Newtonian rheology making quantity of a compound of the formula

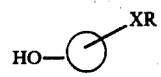

wherein 

is phenyl or naphthyl,

X is a sulfonate ($SO_3^{\ominus}$) group located on the ring in a position which is not ortho to the hydroxyl group, and R is an alkali or alkaline earth metal cation.

DETAILED DESCRIPTION OF THE INVENTION

The aromatic carbonate polymer end-capped and prepared in this invention is the usual type prepared from a dihydric phenol and carbonate precursor.

Aromatic polycarbonates are prepared in the conventional manner by reacting a dihydric phenol with a carbonate precursor in an interfacial polymerization process. Typical of some of the dihydric phenols that may be employed in the practice of this invention are bisphenol-A, (2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxyphenyl)methane, bis 4-hydroxy phenyl sulfone and bis 4-hydroxy phenyl sulfide. Other dihydric phenols of the bisphenol type are also available and are disclosed in U.S. Pat. Nos. 2,999,835; 3,028,365 and 3,334,154. Bisphenol-A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide or a haloformate. The carbonyl halides which can be employed herein are carbonyl bromide, carbonyl chloride and mixtures thereof. The haloformates suitable for use herein include bis-haloformates of dihydric phenols (bis-chloroformates of hydroquinone, bisphenol-A, and the like), or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate polymers of this invention may be prepared by employing a molecular weight regulator, an acid acceptor and a catalyst. The molecular weight regulators which can be employed in carrying out the process of this invention include monohydric phenols such as phenol, chroman-1, parabromophenol, etc. Preferably, phenol is employed as the molecular weight regulator.

A suitable acid acceptor is generally an inorganic base. The inorganic acid acceptor may be one which can be either a hydroxide, a carbonate, a bi-carbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptyl-ammonium iodide, tetra-n-propyl ammonium bromide, tetramethylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydride, haloformyl or mixtures thereof. Examples of these poly-functional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred poly-functional aromatic compounds are trimellitic anhydride or trimellitic acid, or their haloformyl derivatives.

Also, included herein are blends of a linear polymer and a branched polymer. It should be noted that such branched polycarbonates have inherent non-Newtonian viscosity characteristics.

The change in the process pH and the replacement of a relatively small amount of phenolic end-capper with a sulfonated phenol or naphthol brings about a significant change in the rheology of the aromatic carbonate polymer. Usually these polymers exhibit Newtonian rheology over a broad range of shear rates. This can be demonstrated by plotting viscosity against shear rate on a log/log basis. For a standard polycarbonate resin, the linear portion of such a plot, the so-called Newtonian region, will extend to relatively high shear rates. It should be noted that no single Newtonian region can be specified for a polymer since such experimental variables as molecular weight, temperature and orifice size of the viscometer can affect the width of the Newtonian region.

As mentioned above, polycarbonate resins which exhibit enhanced deviations from Newtonian rheology behavior are desirable for certain uses. For these so-called non-Newtonian resins, non-linearity will be observed in a log/log plot of viscosity against shear rate at significantly lower shear rates than for standard polycarbonate.

A convenient alternative to reporting non-Newtonian rheology via the complete viscosity/shear rate plots discussed above is to report the ratio of two viscosity measures determined at two markedly different shear rates (see examples below). These different shear rates are readily achieved by loading the viscometer with ten times the weight of polymer. Thus, a single numerical measure of the non-Newtonian behavior, Melt Index Ratio, is employed.

The interfacial polymerization process for preparing aromatic carbonate polymer is carried out in an alkaline pH range, generally in a pH range of about 9 to about 12. It has been found that pH above about 12 is a necessary reaction condition to instill non-Newtonian rheology in the aromatic carbonate polymer. A pH range of from about 12 to about 13 is generally effective. A range of about 12 to about 12.5 is preferred.

The end-capping agent generally employed in aromatic carbonate chemistry is a member of the phenolic family such as phenols and naphthols. The commonly employed end-capping agent phenol provides an aromatic carbonate polymer of typical intrinsic viscosity (I.V.) of about 0.45 to about 0.55 deciliters/gram and a melt flow of about 16.5 to about 6.5 g/10 min. when present in quantities of about 4 mole percent based on the dihydric phenol present. Generally expected Newtonian rheology is achieved when using phenol end-capping agent even at a pH above 12 in the interfacial polymerization preparation of the aromatic carbonate polymer. However, when a relatively small quantity of the phenol is replaced with a sulfonated phenol or naphthol and the interfacial polymerization is carried out at a pH above about 12, an aromatic carbonate polymer possessing striking non-Newtonian characteristics as measured by melt viscosity and melt index ratio (MIR) is prepared.

The sulfonated phenol or naphthol end-capping agent employed to instill the non-Newtonian behavior in the polymer is a compound of the formula

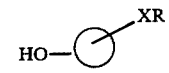

wherein ◯ is phenyl or naphthyl,

X is a sulfonate group ($SO_3^{\ominus}$) located on the ring in a position non ortho to the hydroxyl group, and R is an alkali or alkaline earth metal cation.

The formulae includes naphthol compounds wherein the sulfonate is on the non-hydroxyl containing ring as well as the hydroxyl containing ring. Examples of alkali metal cations are sodium and potassium. Examples of alkaline earth metal cations are calcium and barium.

The quantity of sulfonated phenol or naphthol to be used is an amount sufficient to obtain an aromatic carbonate polymer possessing non-Newtonian rheology. Although the upper limit should have no theoretical maximum, it has been found that when too much of the sulfonated phenol has replaced the usual phenolic end-capping reagent, emulsions during the interfacial polymerization process occur. These emulsions make the processing of the polymer preparation quite difficult and are therefore a practical limitation on the upper concentration limitation of the sulfonated phenol or naphthol. Thus, an essentially non-emulsion making but still non-Newtonian rheology making quantity of the sulfonated phenol or naphthol should be employed. Quantities of the sulfonated end-capping reagent are generally present in the process in quantities of from about 1 to about 7, preferably 2 to about 6 mole percent of the total end-capping reagent present.

The remainder of the end-capping reagent is preferably a phenol. The most commonly employed end-capping reagent, phenol, is preferred. Generally, any of the phenols usually employed as end-capping agents can be employed; however p-tert butyl phenol should generally be avoided since non-Newtonian rheology was not achieved when this end-capping reagent was employed at a pH above 12 with small quantities of sodium p-phenolsulfonate.

It should be noted that it is assumed that the non-Newtonian rheology behavior of the aromatic carbonate polymer is due to the incorporation of the sulfonated phenol or naphthol into the polymer as an end-capping agent. However, since there is no direct proof of this, product by process claims as well as composition claims are also presented.

SPECIFIC EXAMPLES

Below are comparative examples with respect to art methods as well as specific examples within the invention scope. Such examples are only intended to illustrate the broad inventive concept and not to limit it.

EXAMPLE 1

PREPARATION OF POLYCARBONATE AT pH 11 WITH NO SODIUM P-PHENOL SULFONATE END-CAPPING AGENT

To a reactor fitted with a mechanical agitator are charged 5.5 liters of deionized water, 7.0 liters of methylene chloride, 2280 grams (10 moles) of bisphenol-A, 14 milliliters of triethylamine, 3.4 grams of sodium gluconate and 37.6 grams (0.40 moles) of phenol. Phosgene is introduced at the rate of 36 grams/minute and phosgenation is continued for 30 minutes. The pH is maintained at about 11 by the addition of 25% aqueous sodium hydroxide. Since acid is continually being produced in the reaction and aqueous sodium hydroxide is being continually added, the pH will fluctuate over a certain range which is generally from about 10.5 to about 11.5. After phosgenation has ceased, 7 liters of methylene chloride are added, the brine layer is separated by centrifugation and the resin solution washed with dilute hydrochloric acid, water, followed by dilute aqueous sodium hydroxide and water. The resin is steam precipitated and dried. The resin product is then extruded at about 265° C. and the extruded strands chopped into pellets. The pellets are then injection molded at about 300° C. into various sized test samples.

EXAMPLE 2

PREPARATION OF POLYCARBONATE AT pH 11 WITH SODIUM P-PHENOL SULFONATE END-CAPPING AGENT

The same procedure as in Example 1 was carried out, however only 36.7 grams (0.39 moles) of phenol was added. Concurrently with phenol addition there was added 2.32 grams (0.01 mole) of sodium p-phenolsulfonate (2.5 mole % of the total end-capping reagent).

EXAMPLE 3

PREPARATION OF POLYCARBONATE AT pH 12-12.5 WITH NO SODIUM P-PHENOL SULFONATE END-CAPPING REAGENT

The same procedure as in Example 1 was carried out, however, the pH of the reaction was maintained in a range of about 12 to about 12.5.

EXAMPLE 4

PREPARATION OF POLYCARBONATE AT pH 12-12.5 WITH SODIUM P-PHENOL SULFONATE AND T.BUTYLPHENOL END-CAPPING AGENTS

The same procedure as in Example 1 was carried out, however instead of using phenol as the end-capping agent, 57.8 g (0.38 moles) of t.butylphenol and 4.64 g (0.02 mole) of sodium p-phenolsulfonate were employed as the end-capping reagents. Additionally the pH of the reaction was maintained in a range of from about 12 to about 12.5.

EXAMPLE 5

PREPARATION OF POLYCARBONATE AT pH 12 to 12.5 WITH SODIUM P-PHENOLSULFONATE AND PHENOL END-CAPPING AGENTS

The same procedure as in Example 1 was carried out, however the pH of the reaction was maintained between about 12 and 12.5 and the following portions of phenol and sodium phenol sulfonate were used in the preparations.

| PREPARATION | PHENOL | | SODIUM P-PHENOL SULFONATE (NaPSA) | |
|---|---|---|---|---|
| | g | moles | g | moles |
| A | 36.7 | 0.39 | 2.32 | 0.01 |
| B | 35.8 | 0.38 | 2.32 | 0.01 |
| C | 35.8 | 0.38 | 4.64 | 0.02 |
| D | 35.8 | 0.38 | 4.64 | 0.02 |
| E | 34.9 | 0.37 | 6.96 | 0.03 |

EXAMPLE 6

TESTING OF EXAMPLES 1-4 AND 5A-E FOR NON-NEWTONIAN BEHAVIOR

Samples of Examples 1-4 and 5A-E were tested for non-Newtonian behavior by measuring the intrinsic viscosity (I.V.), melt flow, and melt index ratio (MIR) of each of the samples. The I.V. was determined in methylene chloride at 25° C. The melt flow is measured at 300° C. using a modified version of ASTM D 1238 (Condition 0).

The MIR is measured in a manner similar to ASTM D 1238 (Condition 0). It is the ratio of the melt flow determined with 21600 g on the melt index apparatus to the melt flow determined with 2160 g on the apparatus divided by 10, that is:

$$MIR = \left( \frac{MF \text{ at } 21600}{MF \text{ at } 2160} \right) \times \frac{1}{10}$$

Since the melt flow in the numerator is determined at a relatively high shear rate and that in the denominator at a relatively low shear rate any charge in viscosity with shear rate, i.e. any non-Newtonian effects, will be reflected in this number. (Note that a decrease in viscosity results in an increase in melt flow). In the MIR test, the ideal Newtonian resin has an MIR of 1.0. The normal linear polycarbonate gives a MIR of 1.3. Below are the results of the tests.

| EXAMPLE | I.V. | MELT FLOW | MIR |
| --- | --- | --- | --- |
| 1 | 0.477 | 11.3 | 1.3 |
| 2 | 0.469 | 12.4 | — |
| 3 | 0.425 | 11.2 | — |
| 4[1] | 0.573 | 4.31 | 1.51 |
| 5A | 0.473 | 4.26 | 2.9 |
| 5B[2] | 0.441 | 4.96 | 3.45 |
| 5C | 0.492 | 3.21 | 3.35 |
| 5D | 0.475 | 3.48 | 3.15 |
| 5E[3] | 0.378 | ~36.0 | — |

[1] Several later runs using slightly higher quantities of NaPSA did not provide polymer samples in appropriate conditions for testing.
[2] The resin solution was washed two times with 4 liters of 0.1M CaCl$_2$ solution prior to normal work-up.
[3] Emulsion present in processing. Good quality resin was not achieved.

The typical polycarbonate resin of Example 1 prepared in the usual manner gave the expected results. Example 2 demonstrates what happens when a small amount of NaPSA is substituted for phenol in the usual process conditions. Typical values for I.V. and melt flow are obtained. When a higher pH is used in Example 3 with no NaPSA present, once more typical values for I.V. and melt flow are obtained. In Example 4, high pH processing with t.butylphenol and NaPSA gave resin, when capable of being tested, of much higher I.V. and melt flow typical for a resin of that I.V. and a not significantly greater MIR. However, in Examples 5A-D, the effects of high pH and appropriate combinations of phenol and NaPSA end-capping agents are observed. The I.V.s are reasonably equivalent to the I.V.s of typical polycarbonate resin. However, the melt flow is sharply reduced, indicating a marked increase in melt viscosity. This value is reflected in the MIR as well. Clearly, non-Newtonian behavior of the resin is shown. Example 5E shows what occurs when too much NaPSA is present. Emulsions occur during the resin preparation thereby inhibiting the achievement of a quality resin.

As used above NaPSA refers to sodium p-phenolsulfonate and bisphenol-A refers to 2,2-bis-(4-hydroxyphenyl)propane.

What is claimed is:

1. A composition comprising an endcapped aromatic carbonate polymer resin partially end-capped with an essentially non-emulsion making and non-Newtonian rheology making quantity of moiety derived from a compund of the formula

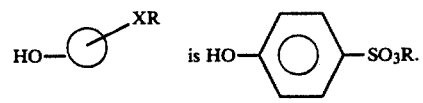

wherein 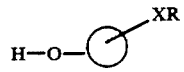

is phenylene or naphthylene,
X is a sulfonate (SO$_3^{\ominus}$) group located on the ring in a position which is not ortho to the hydroxyl group,
R is an alkali or alkaline earth metal cation.

2. A composition in accordance with claim 1 wherein

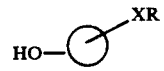

3. A composition in accordance with claim 2 wherein R is an alkali metal cation.
4. A composition in accordance with claim 3 wherein R is sodium or potassium.
5. A composition in accordance with claim 1 wherein the aromatic carbonate polymer resin is non-branched.
6. A composition in accordance with claim 5 wherein the aromatic carbonate polymer resin is derived from bisphenol-A.
7. An endcapped aromatic carbonate polymer resin prepared from a process comprising contacting at a pH greater than or equal to about 12 a dihydric phenol with a carbonate precursor, a non-sulfonated phenolic chain stopper and an essentially non-emulsion making and non-Newtonian rheology making quantity of a compound of the formula

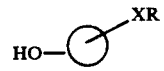

wherein 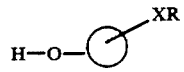

is phenylene or naphthylene,
X is a sulfonate (SO$_3^{\ominus}$) group located on the ring in a position which is not ortho to the hydroxyl group,
R is an alkali or alkaline earth metal cation.

8. A resin in accordance with claim 4 wherein

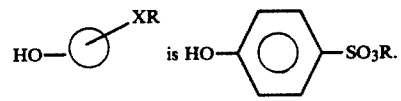

9. A resin in accordance with claim 8 wherein R is an alkali metal cation.
10. A resin in accordance with claim 9 wherein R is sodium or potassium.
11. A polymer in accordance with claim 7 wherein the aromatic carbonate polymer resin is non-branched.
12. A polymer resin in accordance with claim 7 wherein the process pH is from about 12 to about 13.
13. A polymer resin in accordance with claim 11 wherein the dihydric phenol is bisphenol-A.

14. A polymer resin in accordance with claim 18 wherein about 1 to about 7 mol percent of the total chain stopper present is a compound of the formula

15. A process for preparing an end-capped aromatic carbonate polymer resin which comprises contacting at a pH of greater than or equal to about 12 a dihydric phenol with a carbonate precursor, a non-sulfonated phenolic chain stopper and an essentially non-emulsion making and non-Newtonian rheology making quantity of a compound of the formula

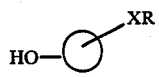

wherein ◯ is phenylene or naphthylene,

X is a sulfonate ($SO_3^{\ominus}$) group located on the ring in a position which is not ortho to the hydroxyl group, R is an alkali or alkaline earth metal cation.

16. A process in accordance with claim 15 wherein

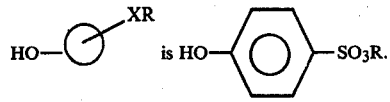

17. A process in accordance with claim 15 wherein the phenolic chain stopper is phenol.

18. A process in accordance with claim 17 wherein R is an alkali metal cation.

19. A process in accordance with claim 18 wherein R is sodium or potassium.

20. A process in accordance with claim 15 wherein the aromatic carbonate polymer resin is non-branched.

21. A process in accordance with claim 15 wherein the pH is from about 12 to about 13.

22. A process in accordance with claim 20 wherein the dihydric phenol is bisphenol-A.

23. A process in accordance with claim 22 wherein about 1 to about 7 mol percent of the total chain stopper present is a compound of the formula

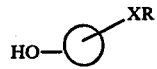

* * * * *

UNITED STATES PATENT AND TRADEMARK OFFICE
CERTIFICATE OF CORRECTION

PATENT NO. : 4,469,860

DATED : September 4, 1984

INVENTOR(S) : Niles R. Rosenquist

It is certified that error appears in the above-identified patent and that said Letters Patent is hereby corrected as shown below:

Column 8, claim 8 should be dependent from claim 7.

Column 9, claim 14 should be dependent from claim 13.

Signed and Sealed this

Twenty-ninth Day of July 1986

[SEAL]

Attest:

DONALD J. QUIGG

Attesting Officer

Commissioner of Patents and Trademarks